(12) United States Patent
Wolbers et al.

(10) Patent No.: US 11,697,746 B2
(45) Date of Patent: *Jul. 11, 2023

(54) PROTECTIVE WATER REVERSIBLE CLEAR COATING FOR SUBSTRATES

(71) Applicant: Conservation Technologies, LLC, Wilkes-Barre, PA (US)

(72) Inventors: Richard Wolbers, Wallingford, PA (US); Anthony Lagalante, West Chester, PA (US)

(73) Assignee: Conservation Technologies, LLC, Wilkes-Barre, PA (US)

( * ) Notice: Subject to any disclaimer, the term of this patent is extended or adjusted under 35 U.S.C. 154(b) by 790 days.

This patent is subject to a terminal disclaimer.

(21) Appl. No.: 16/109,860

(22) Filed: Aug. 23, 2018

(65) Prior Publication Data

US 2018/0362795 A1 Dec. 20, 2018

Related U.S. Application Data

(63) Continuation-in-part of application No. 14/775,023, filed as application No. PCT/US2014/027776 on Mar. 14, 2014, now Pat. No. 10,093,827.

(60) Provisional application No. 61/787,668, filed on Mar. 15, 2013.

(51) Int. Cl.

| | |
|---|---|
| C09D 133/08 | (2006.01) |
| B44C 1/00 | (2006.01) |
| C09D 133/10 | (2006.01) |
| C09D 179/00 | (2006.01) |
| C09D 133/06 | (2006.01) |
| C09D 133/02 | (2006.01) |
| C08L 33/06 | (2006.01) |
| C08L 33/02 | (2006.01) |
| C08L 33/26 | (2006.01) |
| B05D 1/32 | (2006.01) |
| C09D 5/02 | (2006.01) |
| B05D 7/00 | (2006.01) |
| C09D 7/65 | (2018.01) |
| C08L 79/02 | (2006.01) |
| C09D 179/02 | (2006.01) |

(52) U.S. Cl.
CPC .......... C09D 133/08 (2013.01); B05D 7/574 (2013.01); B44C 1/00 (2013.01); C08L 33/064 (2013.01); C08L 79/02 (2013.01); C09D 5/024 (2013.01); C09D 7/65 (2018.01); C09D 133/02 (2013.01); C09D 133/064 (2013.01); C09D 133/10 (2013.01); C09D 179/00 (2013.01); C09D 179/02 (2013.01); B05D 1/327 (2013.01); B05D 7/53 (2013.01); C08L 33/02 (2013.01); C08L 33/26 (2013.01)

(58) Field of Classification Search
None
See application file for complete search history.

(56) References Cited

U.S. PATENT DOCUMENTS

| | | | |
|---|---|---|---|
| 3,574,784 A | 4/1971 | Litt et al. | |
| 4,067,837 A * | 1/1978 | Miller | C09C 1/28 106/453 |
| 4,147,674 A | 4/1979 | Vasta | |
| 4,241,141 A * | 12/1980 | Dill | C09D 133/064 134/4 |
| 4,889,765 A * | 12/1989 | Wallace | C08L 77/12 442/72 |
| 5,093,396 A * | 3/1992 | Calhoun | C09D 5/14 524/204 |
| 5,191,014 A * | 3/1993 | Roberts | C09D 5/008 524/833 |
| 5,276,075 A | 1/1994 | Santini | |
| 5,281,436 A * | 1/1994 | Swidler | C09D 133/064 427/154 |
| 5,719,221 A | 2/1998 | Swidler | |
| 6,761,969 B2 | 7/2004 | Li | |
| 6,773,746 B1 * | 8/2004 | Bell | C09D 5/008 427/259 |
| 10,093,827 B2 * | 10/2018 | Wolbers | C09D 5/02 |
| 2003/0185990 A1 * | 10/2003 | Bittner | C09D 5/08 427/385.5 |
| 2004/0138458 A1 | 3/2004 | Schadeli | |
| 2004/0138328 A1 * | 7/2004 | Kohr | C08G 18/6229 522/149 |
| 2005/0013790 A1 | 1/2005 | Yamaki | |
| 2005/0163994 A1 | 7/2005 | Rouppert et al. | |

(Continued)

FOREIGN PATENT DOCUMENTS

| | | |
|---|---|---|
| JP | 56136844 A | 2/1981 |
| JP | 2007145981 A * | 6/2007 |

(Continued)

OTHER PUBLICATIONS https://pubs.acs.org/doi/abs/10.1021/ba-1986-0213.ch023, Year 1986, pp. 425-433 (Year: 1986).*
JP-2007145981-A, Jun. 2007 (Year: 2007).*
Arslanoglu, J., et al., "Evaluation of the Use of Aquazol as an Adhesive in Painting Conservation", WAAC Newsletter, vol. 25, No. 2, pp. 12-18, 2003.
Supplementary European Search Report issued in corresponding European Patent Application No. 14765740.7 dated Oct. 21, 2016.

(Continued)

*Primary Examiner* — Satya B Sastri
(74) *Attorney, Agent, or Firm* — Vos-IP, LLC

(57) ABSTRACT

A protective, sacrificial, water-reversible, coating composition for the protection of substrates comprised of water, a volatile base, a film-forming acrylic polymer in a water dispersion form, a compatabilizing polymer, specifically poly (2-ethyl-2-oxazoline), a poly acidic polymer (pH specific in terms of its solubility), wherein said coating is both water applied and water reversible or re-soluble under specific pH conditions.

19 Claims, No Drawings

(56) References Cited

U.S. PATENT DOCUMENTS

| | | | |
|---|---|---|---|
| 2005/0171274 A1 | 8/2005 | Even | |
| 2006/0030662 A1 | 2/2006 | Yang et al. | |
| 2011/0049053 A1* | 3/2011 | Hirsch | C02F 5/14 |
| | | | 210/652 |
| 2013/0040058 A1 | 2/2013 | Friedel et al. | |
| 2014/0005322 A1* | 1/2014 | Akkerman | C08G 18/69 |
| | | | 524/501 |
| 2020/0122106 A1* | 4/2020 | Leiske | C08L 79/02 |

FOREIGN PATENT DOCUMENTS

| | | |
|---|---|---|
| WO | WO/1990/001051 A1 | 2/1990 |
| WO | WO/2010/102072 A2 | 9/2010 |
| WO | WO/2014/143705 A1 | 9/2014 |
| WO | WO-2014143705 A1 * | 9/2014 ........... C09D 133/02 |
| WO | WO/2015/131290 A1 | 9/2015 |

OTHER PUBLICATIONS https://chemistry.stackexchange.com/questions/5125/what-chemicals-are-in-tap-water-that-gives-it-a-slightly-basic-ph-level; Retrieved on Mar. 15, 2018; Edited Aug. 1, 2016. (Year; 2016).

Dillon, C.E., et al., "Aqueous cleaning of acrylic emulsion paint films. The effect of solution pH, conductivity and ionic strength on film swelling and surfactant removal", Studies in Conservation, vol. 57, No. 1, pp. 52-62, 2014.

Hamilton, D.L. "Adhesives and Consolidants", Methods of Conserving Archaeological Material from Underwater Sites, Jan. 1, 1999, 11-17 pg. Nautical Archaeology Program Department of Anthropology Texas A&M University, College Station, TX, http://nautarch.tamu.edu/CRL/concervationmanual/File2.htm.

International Search Report issued in International Application No. PCT/US2014/027776 dated Aug. 19, 2014.

Packard, Elisabeth C. G., Air Code of Ethics and Guidelines for Practice, Revised, 1994, 11 pgs., http://www.nps.gov/training/tel/Guides/HPS1022_AIC_Code_of_Ethics.pdf.

Smith, G.D., "Aging characteristics of contemporary acrylic emulsion used in artists' paints", in Modern Paints Uncovered, eds. T. Learner, P. Smithen, J. Krueger, and M. Schilling, pp. 236-246, Los Angeles: Getty Conservation Institute, 2007.

Wolbers, R., et al., "Cleaning Emulsion Paints: Preliminary Extractive Studies with Two Commercial Paint Systems", New Insights into the Cleaning of Paintings, Proceedings from the Cleaning 2010 International Conference, Universidad Politecnica de Valencia and Museum Conservation Institute, Eds. Marion F. Mecklenburg, A. Elena Charola and Robert J. Koestler, Smithsonian Contributors to Museum Conservation, No. 3 pp. 147-157, 2013.

Zumbuhl, S., et al., "Solvent Action on Dispersion Paint Systems and the Influence on the Morphology—Changes and Destruction of the Latex Microstructure", In Modern Paints Uncovered, eds. T. Learner, P. Smithen, J. Krueger, and M. Schilling, pp. 257-268, Los Angeles: Getty Conservation Institute, 2007.

* cited by examiner

PROTECTIVE WATER REVERSIBLE CLEAR COATING FOR SUBSTRATES

CROSS REFERENCE TO RELATED APPLICATIONS

This application is a continuation-in-part of prior application Ser. No. 14/775,023, filed Sep. 11, 2015, which was the National State of International Application No. PCT/US2014/027776, filed Mar. 14, 2014, which claims the benefit of U.S. Provisional Application No. 61/787,668, filed Mar. 15, 2013.

FIELD OF THE INVENTION

Presently disclosed embodiments are related to compositions for protecting substrates with a coating that is water miscible and wherein said coating is both water applied and water reversible under specific pH conditions.

BACKGROUND

In the field of art conservation, one of the guiding principles is that of reversibility. The American Institute for Conservation of Historic and Artistic Works (AIC) is the only national membership organization in the United States dedicated to the preservation of cultural material. Conservation treatment guidelines pertaining to 'Compensation for Loss' state that "any intervention to compensate for loss should be documented in treatment records and reports and should be detectable by common examination methods. Such compensation should be reversible and should not falsely modify the known aesthetic, conceptual, and physical characteristics of the cultural property, especially by removing or obscuring original material." See, http://www.nps.gov/training/tel/Guides/HPS1022_AIC_Code_of_Ethics.pdf. At minimum, "compensation must be reversible, using chemical and/or mechanical methods that will not adversely affect the remaining original material, unless this jeopardizes structural stability." In preservation, this idea of reversibility is important to both preserve the original intent of the artist, as well as to periodically assess and maintain structural stability while preserving the visual unity of a work of art. Coatings on art should ideally provide a physical, transparent, removable barrier between the outside world and the artwork beneath. In this sense they are intentionally sacrificial and their intended usages range from protecting artworks from natural processes (e.g., ultraviolet irradiation, atmospheric gases) to vandalism (e.g., graffiti, tagging).

In application, restoration and protective coatings for fine art surfaces must have excellent aging properties and remain soluble in appropriate solvent systems so that they may be replaced or repaired periodically. Several examples of these kinds of solvent reversible coatings that have been adopted for, or function well in museum, gallery, and indoor spaces can be cited (http://nautarch.tamu.edu/CRL/conservation-manual/File2.htm); these include poly(vinyl acetate), polyvinyl alcohol, reduced ketone resins, reduced aldehyde resins, and poly acrylates to name just a few. Typical solvents for the application and removal of artistic clear coatings derived from these type of polymers (e.g., 'synthetic varnishes') include (but are not limited to) low boiling point aliphatic hydrocarbon solvents, toluene, xylene, alcohols, mineral spirits (e.g., turpentine), acetone and mixtures thereof. Solvent systems are generally highly volatile, relatively toxic, and their use and proper disposal is subject to federal, state, and local standards and regulations (e.g., OSHA, NIOSH). Conservation procedures often involve the application and removal of materials that may endanger the health and safety of conservation professionals, other contracted persons involved in carrying out procedures, and the public in outdoor settings. With increased environmental awareness, there is a strong desire to develop improved technologies that would allow use of water-based coating systems to protect art and artifacts in general.

Art that is displayed or is created specifically in outdoor contexts (mural arts for instance) also require coatings to be applied to them for the same reasons cited above. Coatings applied on these materials must also meet the requirement of reversibility, as well as the aesthetic, and protective functional demands but in extreme environments very different from the museum or gallery context (cycling RH and temperatures, freeze/thaw cycling, wind, rain and other atmospheric conditions), and must comply with stringent environmental requirements.

Many outdoor murals are constructed by artists using acrylic colors. For example, see http://www.goldenpaints.com/technicaldata/murals.php. Unfortunately, many acrylic colors have been found to weather poorly and degrade rapidly in outdoor contexts. See, http://www.getty.edu/conservation/publications_resources/newsletters/18_2/feature.html. It should be noted that artist's acrylic paints have been found to be easily and substantially extracted with a wide array of solvents and with pure water, and water with only limited alterations made to it. (Smith, G. D. 2007, Aging characteristics of a contemporary acrylic emulsion used in artists' paints, In *Modern Paints Uncovered*, eds. T. Learner, P. Smithen, J. Krueger, and M. Schilling, 236-246, Los Angeles: Getty Conservation Institute; Zumbühl, S., F. Attanasio, N. Scherrer, W. Müller, N. Fenners, and W. Caseri, 2007, Solvent action on dispersion paint systems and the influence of morphology—changes and destruction of the latex microstructure, In *Modern Paints Uncovered*, eds. T. Learner, P. Smithen, J. Krueger, and M. Schilling, 257-268, Los Angeles: Getty Conservation Institute).

Recent research has identified that aqueous systems whereby such solution parameters as pH, overall ionic concentrations, and specific ion effects, as well as adjuvant materials like surfactants, chelators, buffers, etc., can mitigate the swelling, extraction, and general degradation of these kinds of paints associated with water alone and are therefore useful properties to manage in aqueous solutions to aid both in the application as well as in the removal of potential protective coatings. (R. Wolbers, A. Norbutus and A. Lagalante "Cleaning of Acrylic Emulsion Paints: *Preliminary Extractive Studies with Two Commercial Paint Systems*", New Insights into the Cleaning of Paintings, Proceedings from the Cleaning 2010 International Conference, Universidad Politécnica de Valencia and Museum Conservation Institute, Eds. Marion F. Mecklenburg, A. Elena Charola, and Robert J. Koestler, *Smithsonian Contributions to Museum Conservation*, no. 3 (2013); C. E. Dillon, A. F. Lagalante and R. C. Wolbers "Aqueous cleaning of acrylic emulsion paint films. The effect of solution pH, conductivity and ionic strength on film swelling and surfactant removal" *Studies in Conservation* 57(1), 52-62 (2014)).

While no coatings have been developed specifically for outdoor fine art applications over acrylic paints, there are coatings that are nonetheless being used to that effect. Solvent based, and solvent (only) removable coatings are at present commercially available and being used by artists to coat their own work. Golden Acrylic Colors 'GEL Soft Gloss, MSA Varnish with Ultraviolet light stabilizers (UVLS) (http://www.goldenpaints.com/technicaldata/murals.php) is an example of a coating that is recommended by the manufacturer to be applied by the artists to their own work, and ostensibly removed in this manner. A 2010 mural arts practices survey (http://www.muralroutes.com/resources/Mural 20Arts %20Practices %20Survey final. pdf) documented the range of solvent borne coatings being applied by artists to their own works. In addition to the Gel Soft Glass MSA varnish from Golden, these have also included Varathane Diamond Polyurethane; Nova Color Acrylic Mat Varnish, GAC-500 acrylic polymer, Benjamin Moore Stays Clear (Polyurethane), Behr 'Premium Plus Ultra, Deep Base Clear', One Shot Clear Coat UV, Ronan Vinyl Cote UV Absorber Gloss, Stevenson's varnish, Aquarius Coatings Armaglaze 6000, Liquitex, Graffitex, Semigloss, Rohm and Haas' Paraloid B72, PPG's Deltron DC3000 (with DCU2060), Aquacoat's Auto Top Coat, and Adi color's DFV clear coat. But all of these materials are essentially irreversible or only reversible in solvents that would affect the underlying paints, and must be considered irrevocably part of the art works. Several of these coatings have been tested for reversibility and have not met with any success without damage to the paints beneath. (http://www.getty.edu/conservation/our_projects/science/outdoor/index.html).

In a related art, the use of water-based, oligomeric organosiloxanes with fluorinated alkyl groups as anti-graffiti coatings is well known (US20130040058 A1). However, a problematic element which has emerged in the use of these aqueous formulations is their film-forming properties. When the known water-based anti-graffiti formulations are applied, coherent films are not always formed. Additionally, these materials, while water applicable, become intractable to water on drying/curing and can only also be reversed with solvents that would damage the paints beneath.

Said coatings however would have to be not only compatible with artist's acrylic paints, but as well with the building substrate materials they have been applied to. Building substrates also contribute to the problem of finding coating materials appropriate for mural paintings. These might include, but not be limited to: brick, mortar, cementitious, metal, wood, and ceramic materials. The variety of substrate materials, variation in their condition, variations in surface preparations on each of these materials can also contribute to applied paint and coating deterioration or failure in outdoor contexts. One of the special requirements of coatings applied to building envelopes is that they have a high moisture vapor transmission value or rate (MVTR). Without the ability to allow for moisture vapor to pass through all the materials that encase buildings (including decorative and coating materials), precipitation of soluble salts on drying, or freezing and expansion of condensed or trapped water at below 0° C. temperatures would inevitably occur. To date, it has been difficult to formulate water-based coating systems that show acceptable adhesion to underlying painted surfaces, are resistant to moisture contact yet have sufficient water vapor permeability so as not to trap water vapor that can damage the underlying artwork or building exterior in freeze/thaw cycles. The coating must withstand outdoor environments which are subject to wide variations in temperature, humidity, and solar irradiation. When exposed to nature, the coating must withstand wind, sun, hail, rain, particulates, and extremes in temperature without blistering, peeling, or cracking that would compromise the visual appearance or protection of the underlying artwork.

Aqueous coatings that could be applied and reversed with aqueous methods are more likely to meet ever increasingly stringent VOC (volatile organic compound) regulations. Local, state, and federal VOC laws restrict severely the types and amounts of solvents that are inherent in, and that can be used to both apply and reverse or re-solubilize restoration coatings (http://www.issa.com//data/File/regulatory/VOC %20Limits %20Summary %2010-25-13.pdf). And new regional VOC regulatory standards (e.g. Northeast Ozone Transport Commission (NOTC), California Air Resource Board (CARB), or the South Coast Air Quality Management District (SCAQMD)) differ from U.S. Environmental Protection Agency (USEPA) national VOC standards. In general, the new regional regulations are more restrictive in lowering the maximum amount of VOC's allowed in these areas. For instance, for the Northeast and Mid-Atlantic region the NOTC Phase I Model Rule, as of Jan. 1, 2005 for 'industrial maintenance' coatings is set at or limited to 340 g/L. See, (http://www.vexcon.com/pdfs/pi100vexconvocguide.pdf). With ever increasing emphasis placed on lower VOC emissions from film forming coatings or paints, coatings having much lower VOC emissions levels are required.

Potential protective coatings that were both applied from aqueous solutions or dispersions and removable with aqueous materials would be highly desirable and better meet environmental, as well as the AIC standard of practice that requires reversibility of applied coatings.

SUMMARY

Embodiments of the present disclosure relate to a coating composition whereby, in application, that can function as a restoration and protective coating for a substrate, and wherein said protective coating embodies the aesthetic, physical, chemical and aging properties suitable for administration to said substrate and, wherein the coating composition can be disrupted by solubilizing the poly acidic polymer, thereby rending the film removable under appropriate water-based system so that it may be replaced or repaired periodically, without harm to the substrate itself.

A further embodiment of the present disclosure provides a coating composition for a water-based coating system that can be used to form durable, protective barriers on exterior painted surfaces. The coating system is particularly suited to protecting outdoor painted public art, such as murals. While the impact of rain at slightly acidic pH will not remove or affect the coating, should the need arise to remove the coating due to natural aging or as a result of vandalism, the coating can be re-solubilized in an aqueous solution, for example an aqueous buffer, where the pH is adjusted to above 7.0. Moreover, because both the application and removal of the coating is effected by entirely aqueous means, for example aqueous buffers, solvent emission regulation during manufacturing, application, and removal are more likely to meet local, state, and federal guidelines for solvent emissions standards in public areas. Further, the present invention allows for a coating that will be compatible with not only painted exterior surfaces, but with building substrate materials as well, allowing the transmission of moisture vapor to pass through it at a rate commensurate with the paints themselves.

The present invention provides a composition comprising: an aqueous medium, a volatile base, an acrylic film-forming polymer, a compatibilizing polymer (compatibilizer), preferably a polyoxazoline, and a poly acidic polymer (pH specifically reversible)and wherein said composition is capable of being applied to a substrate using aqueous means and removed from said same substrate using aqueous means, for example an aqueous buffer, at a specific pH. Preferably, the composition comprises between 0.1 and 30% by weight of the polyacidic polymer. In certain embodiments, wherein said composition is substantially free from an alkaline swellable thickener selected from acrylic emulsions and polyurethane thickeners, The present invention also provides a composition comprising: an aqueous medium, a volatile base, an acrylic film-forming polymer, a compatibilizing polymer (compatibilizer), preferably a polyoxazoline, and a poly acidic polymer (pH specifically reversible), and wherein said composition is capable of being applied to a substrate using aqueous means and removed from said same substrate using aqueous means, for example an aqueous buffer, at a specific pH. Preferably, the composition comprises between 0.1 and 30% by weight of the polyacidic polymer.

The present invention also provides a composition comprising: an aqueous medium, a volatile base, an acrylic film-forming polymer, a compatibilizing polymer (compatibilizer), and a poly acidic polymer (pH specifically reversible), and wherein said composition is capable of being applied to a substrate using aqueous means and removed from said same substrate using aqueous means, for example an aqueous buffer, at a specific pH, wherein said composition has a $T_g$ less than 13° C. and a MVTR between 80 and 180 g/m²/day. Preferably, the compatibilizing polymer is a polyoxazoline. Preferably, the composition comprises between 0.1 and 30% by weight of the poly acidic polymer. Preferably, the composition comprises between 5 and 50% by weight of the compatibilizer. Preferably, the composition comprises 30-90% by weight of the acrylic film-forming polymer. In certain embodiments, the composition further comprises an alkaline swellable thickener.

In certain embodiments, said polyacidic polymer is a co-polymer consisting of monomers of both methacrylic acid and a second monomer of either methyl methacrylate or ethyl acrylate, or combinations thereof, and wherein the ratio of said co-monomers in the polyacidic polymer determines the pH at which the poly acidic polymer will be soluble in an aqueous buffer, and wherein the disruption and removal of a coating will be a function of pH, wherein the disruption and removal of said coatings is within a pH range of between 6-10. In preferred embodiments, the poly acidic polymer is selected from the group consisting of: methacrylic acid-methyl methacrylate copolymer (1:1), methacrylic acid-methyl methacrylate copolymer (1:2), methacrylic acid-ethyl acrylate copolymer (1:1), or combinations thereof The present invention also provides a composition comprising: an aqueous medium, a volatile base, an acrylic film-forming polymer, a compatibilizing polymer (compatibilizer), preferably a polyoxazoline, and a polyacidic polymer (pH specifically reversible), and wherein said composition is capable of being applied to a substrate using aqueous means and removed from said same substrate using aqueous means, for example an aqueous buffer, at a specific pH, wherein said composition has a $T_g$ less than 13° C. and a MVTR between 80 and 180 g/m²/day.

A method of coating a substrate with a removable composition comprising: Forming a composition according to the invention, coating said substrate with said composition, and allowing said composition to dry. Also provided is a method of coating a substrate with a removable composition comprising (a) coating said substrate with a composition of the invention and (b) allowing said composition to dry.

A method of coating a substrate comprising: Applying a first layer of a composition according to the invention, applying a second layer of a second composition comprising: water, a volatile base, a film-forming acrylic polymer, a poly (2-ethyl-2-oxazoline), and a poly acidic polymer (pH specifically reversible), and wherein said first and second compositions are capable of being re-solubilized at a different pH, preferably via an aqueous buffer. Preferably, the aqueous buffer is between pH 7 and pH 10.

A further embodiment is directed to a composition comprising: an aqueous medium, a volatile base, a film-forming acrylic polymer, a poly (2-ethyl-2-oxazoline), and a poly acidic polymer (pH specifically reversible), and which is capable of being applied to a previously painted substrate using aqueous means and removed from said same substrate using aqueous means, for example aqueous buffers, at a specific pH. In preferred embodiments, said composition comprises between 0.1 and 30% by weight of the poly acidic polymer. In preferred embodiments, the coating composition further comprises about 5-50% by weight of the polyoxazoline. In preferred embodiments, the composition comprises between 30 and 90 percent by weight of the acrylic film forming polymer. In preferred embodiments, the composition can be removed by an aqueous buffer of greater than 0.5M at a pH of between 7 and 10. In preferred embodiments, the aqueous buffer dissolves the polyacidic polymer, imparting the ability to remove the composition from the substrate.

A further embodiment of the present disclosure is a method for protecting a substrate comprising administering a first coating composition wherein said coating composition is re-solubilizable at a first pH, preferably in an aqueous buffer, and administering a second coating composition on top of said first coating composition, wherein said second coating composition is re-solubilizable, preferably in an aqueous buffer, at a second, lower pH, and wherein the first pH and said second pH are differentiated by at least 0.5 pH units. A further embodiment, comprises at least a third coating composition. A further embodiment comprises at least four different coating compositions.

A further embodiment of the present disclosure is the application of a coating that specifically is removable at a given pH, for example in an aqueous buffer, and that has been applied over an initial solvent applied coating material that is insoluble in (i.e. cannot be removed by water) and unaffected by an aqueous preparation, for example an aqueous buffer, designed to remove the pH sensitive coating.

A further embodiment is directed to a composition suitable for selectively coating a substrate and capable of being applied and removed under aqueous means, said composition comprising: an aqueous medium, a volatile base, a film-forming acrylic polymer, a compatibilizing polymer (compatibilizer), and a poly acidic polymer (pH specifically reversible), and wherein said composition is capable of being applied to a substrate using aqueous means and removed from said same substrate using aqueous means, for example aqueous buffers, at a specific pH.

The present invention also relates to the use, as a reversible coating to protect a substrate, of a coating composition comprising an aqueous medium, a volatile base, an acrylic film-forming acrylic polymer, a compatibilizer (preferably a polyoxazoline), and a poly acidic polymer. In preferred embodiments, the coating composition comprises between 0.1 and 30% by weight of the poly acidic polymer. In preferred embodiments, the coating composition further comprises about 5-50%, by weight of the polyoxazoline. In preferred embodiments, the composition comprises between 30 and 90 percent by weight of the acrylic film forming polymer. In preferred embodiments, the composition can be removed by an aqueous buffer of greater than 0.5M. In preferred embodiments, the aqueous buffer imparts reversibility by dissolving the polyacidic polymer.

The present invention also provides a latex paint comprising a compatibilizing polymer as defined herein and a polyacidic polymer as defined herein. In this example, the latex paint takes the place of the film-forming polymer.

In preferred embodiments, the invention also includes an anti-corrosive agent for a transparent coating or a pigmented coating. In certain embodiments, the invention comprising an anti-corrosive agent is used for coating a metallic substrate.

The latex paint may be any paint based on an aqueous dispersion of polymer particles. Said polymer particles are typically substantially insoluble in water. The polymer particles may comprise a synthetic polymer. Examples of such synthetic polymers include acrylic polymers, vinyl acrylic polymers (PVA), epoxy polymers and styrene acrylic polymers. The latex paint may be based on a commercially available latex paint, for example a commercially available colored film-forming latex paint (e.g. a pigmented latex paint such as Valspar Interior Latex). The latex paint may further comprise pigments, dyes, or other colorant or visual effects materials. For instance, said latex paint may comprise a pigment such as titanium dioxide, iron oxide, chromium oxide, carbon or combinations thereof The compatibilizing polymer may be a polyoxazoline. Preferred compatabilizing oxazoline polymers include poly (2-ethyl-2-oxazoline), poly (2-methyl-2-oxazoline), and poly (2-isopropyl-2-oxazoline), or combinations thereof. Most preferably the compatibilizing polymer is poly(2-ethyl-2-oxazoline).

The polyacidic polymer may be an acrylic resin which comprises at least one vinyl or vinylidene moiety having a carboxylic acid group capable of salt formation. The acrylic resin may comprise at least one vinyl or vinylidene moiety having a carboxylic acid group capable of salt formation and at least one alkyl acrylate or alkyl methacrylate moiety. The acrylic resin also may comprise at least one vinyl or vinylidene moiety having a carboxylic acid group capable of salt formation, at least one alkyl acrylate or alkyl methacrylate moiety, and at least one other vinyl or vinylidene moiety co-polymerizable with a) the alkyl acrylate or alkyl methacrylate moiety and b) the vinyl or vinylidene moiety having a carboxylic acid group capable of salt formation. Further, the acrylic resin may comprise at least one vinyl or vinylidene moiety having a carboxylic acid group capable of salt formation and at least one other vinyl or vinylidene moiety co-polymerizable with the vinyl or vinylidene moiety having a carboxylic acid group capable of salt formation. Typically, the poly acidic polymer is water soluble upon forming a dried coating.

Polyacidic polymers include cellulose acetate phthalate, methacrylate-based polymers, cellulose acetate, trimellitate, hydroxypropyl methylcellulose phthalate. Preferably, the polyacidic polymer is an acrylic resin which comprises: (1) from 20 to 90 percent by weight of at least one alkyl acrylate or alkyl methacrylate moiety; (2) from 80 to 15 percent by weight of at least one vinyl or vinylidene moiety having a carboxylic acid group capable of salt formation; and (3) from 0 to 30% percent by weight of at least one other vinyl or vinylidene moiety copolymerizable with (1) and (2). For example, the alkyl acrylate (1) may be ethyl acrylate, and the vinyl moiety (2) may be methacrylic acid. Evonik's Eudragit L 100-55, L-100, and S-100 resins are examples of copolymer systems meeting this definition.

Typically, the polyacidic polymer is a co-polymer of methacrylic acid and either methyl methacrylate or ethyl acrylate, or combinations thereof. For instance, the polyacidic polymer may be selected from the group consisting of: methacrylic acid-methyl methacrylate copolymer (1:1), methacrylic acid-methyl methacrylate copolymer (1:2), methacrylic acid-ethyl acrylate copolymer (1:1), or combinations thereof. The ratio of said co-monomers in the polyacidic polymer determines the pH at which the poly acidic polymer will be soluble in an aqueous buffer, such that the disruption and removal of the latex paint will be a function of pH. Typically, the disruption and removal of said latex paint is within a pH range of between 6-10.

Typically, the latex paint comprises between about 30-90% of the total percentage of the composition. When formed as a removable latex paint, it would additionally comprise 0.1 to 30% by weight of the polyacidic polymer, and between 5 and 50% by weight of the compatibilizing polymer.

Typically, said latex paint is removable such that when the latex paint is applied to a substrate it can be removed from said substrate using an aqueous buffer, for example by disruption of the latex paint. The pH of the aqueous buffer used to remove the paint may be at least 6, preferably at least 7, for example between pH 7 and pH 10. The paint may be removed by an aqueous buffer of a concentration of greater than 0.5M, i.e. a buffer in which the sum of the concentrations of acid and base dissolved in the buffer is greater than 0.5M. For example, the paint may be removed by an aqueous buffer with a concentration of greater than 0.5 M and with a pH of between 7 and 10. The aqueous buffer may be any aqueous solution buffered to an appropriate pH comprising a weak chelating material such as citrate (e.g. citrate above a pH of 6.5). The aqueous buffer may be a citrate or phosphate aqueous buffer at pH 7, such as potassium dihydrogen phosphate 0.5M and citrate 0.5M, or at pH 8, such as citrate 0.5M, 0.5M triethanolamine.

The latex paint may comprise an alkaline swellable thickener. Typically, the alkaline swellable thickener is an alkali swellable carboxylated polymer. Preferably the alkaline swellable thickener comprises an acrylic acid polymer or copolymers. Such acrylic acid polymers or copolymers will possess one or more carboxylic acid groups that can be neutralized or esterified in the presence of a base. The alkaline swellable thickener may be hydrophobically modified, for example the alkaline swellable thickener may be an hydrophobically modified alkaline swellable emulsion. Acrysol® ASE-60 (available from Rohm & Haas), Acrysol® ASE-75, Rheolate® 450 and Rheolate® 420, Elementis Rheolate®255, Rheolate® 216 and Rheolate® 1 are examples of suitable alkaline swellable thickeners. Alternatively, the latex paint may be substantially free from any alkaline swellable thickener, or may be substantially free from an alkaline swellable thickener selected from acrylic emulsions and polyurethane thickeners.

The present invention also provides a method of coating a substrate with a removable latex paint comprising: a) coating said substrate with the latex paint as described above, and b) allowing said paint to dry.

The present invention also relates to the use of a paint additive comprising a compatibilizing polymer as described above and a polyacidic polymer as described above to render a latex paint removable. Typically, the latex paint is removable such that when the latex paint is applied to a substrate it can be removed from said substrate by applying an aqueous buffer as described above. The paint additive may comprise an alkaline swellable thickener as described above.

The paint additive may be substantially free from any alkaline swellable thickener, or may be substantially free from an alkaline swellable thickener selected from acrylic emulsions and polyurethane thickeners. In a preferred embodiment, the additive, comprising the compatibilizing polymer and the polyacidic polymer are added to the latex paint. For example, the additive can be added after manufacture of a paint and blended into the paint for use. Or the paint can be manufactured with the compatibilizing polymer and the poly acidic polymer and provided ready-to-use, wherein the paint would be removable with the appropriate aqueous buffer as described herein.

The present invention also provides a method of preparing a removable latex paint as described herein comprising blending into a latex paint a sufficient amount of a compatibilizing polymer as described above and a sufficient amount of a polyacidic polymer as described above to make said paint removable. Typically, the latex paint is removed by applying an aqueous buffer as described above. In certain embodiments, the aqueous buffer disrupts the film composition allowing for removal. The latex paint may comprise an alkaline swellable thickener as described above. The latex paint may be substantially free from any alkaline swellable thickener, or may be substantially free from an alkaline swellable thickener selected from acrylic emulsions and polyurethane thickeners.

A composition comprising: an aqueous medium, a volatile base, an acrylic film-forming polymer comprising a pigment, a compatibilizing polymer, and a poly acidic polymer, and wherein said composition is capable of being applied to a substrate using aqueous means and removed from said same substrate using aqueous buffered means at a specific pH. The composition optionally comprising an alkaline swellable thickener selected from acrylic emulsions and polyurethane thickeners. The composition comprising an anticorrosive agent selected from an alkaline medium stable inhibitor of any of anodic, cathodic, or mixed inhibition.

DETAILED DESCRIPTION OF PREFERRED EMBODIMENTS

All references cited herein are hereby incorporated by reference in their entirety.

As used herein, the term "about" is intended to encompass a range of values ±10% of the specified value(s). For example, the phrase "about 20" is intended to encompass ±10% of 20, i.e. from 18 to 22, inclusive.

As used herein the term "substantially free" when used in connection with the said alkaline swellable thickeners indicates that the composition contains less than 5 wt %, preferably less than 3 wt %, more preferably less than 2 wt %, more preferably less than 1 wt % of the thickener, based on the total weight of the composition.

The terms "clear coating," or "varnish," or "protective coating," or "coating" will be used to designate a covering material that is applied to the surface of an a painted surface and/or the underlying supporting materials that the paint has been applied to. The purpose of applying the coating may be decorative, functional, or both. The coating itself may form a continuous film or layer over the substrate, or it may only cover parts of the substrate.

The terms "murals," "outdoor paintings," or "wall paintings" will all be used in this context to refer to any piece of artwork painted or applied directly on a wall, ceiling or other large permanent surface associated with or inherent in an architectural setting. Murals are generally executed on or intimately associated with building substrate materials. The definition of a mural also includes paintings or painted materials that are executed first on canvas or other transferrable support materials and then adhered to the building substrate materials (i.e., these are often referred to as 'marouflaged' paintings)

The term "Coalescence" is to mean a process in which two phases or domains of the same composition come together and form a unified solid. In the present context a coalescing agent is a solvent like material that allows for a dispersed acrylic polymer to overcome the separating materials or forces that allow for its dispersal in water to be overcome and for the acrylic polymer to meld into a continuous film.

A "UV Stabilizer" protects a material from the long-term degradation effects from light, most frequently ultraviolet radiation. Different UV stabilizers are utilized depending upon the substrate, intended functional life, and sensitivity to UV degradation.

A "de-foamer" or an "anti foaming agent" is a chemical additive that reduces and hinders the formation of foam in industrial process liquids such as paints or coating materials.

"Flatting" or "matting agents" are substances added to paints or varnishes to disperse incident light rays to give the dried surface a non-glossy or matte finish.

"Anti-microbial" refers to a wide range of micro-organism killing or inhibiting materials that include, but are not limited to anti-fungal, anti-bacterial, anti-mold materials. In the present context an antimicrobial material will enable a surface to be rendered sterile, that is specifically inhibits or reduces the ability of microorganisms to grow on the surface of a painted or coated material.

"Glass Transition Temperature" or "$T_g$" refers to the temperature at which an amorphous solid becomes soft upon heating or brittle upon cooling. The glass transition temperature is lower than the melting point of its crystalline form, if the solid has a melting point.

"Miscibility" will be taken to mean the property of substances to mix in all proportions, forming a homogeneous solution. Polymeric materials that are miscible will exhibit a single glass transition temperature.

"Particle size" will be defined by International Standard on presenting various characteristic particle sizes. These may include includes median size, geometric mean size, average size.

"Re-solubilize" will be taken to mean to bring a solidified material back into a finely dispersed or micellular form of solid in liquid (water in the present context). The process of solubilization is distinct from that of dissolution (or the act of dissolving a solid completely in a liquid). The amount of the solute in the micellular system can be different (often higher) than the regular solubility of the solute in a given solvent.

The term "reversibility" shall mean ease of separation of one material from another. For instance: a coating shall be said to be reversible if it can substantially be removed from an underlying paint by any means whereby the coating is 99% removed from a painted surface without damage or alteration to the underlying paint either aesthetically, chemically or physically. However, it is understood that while no damage is expected, or would be difficult to even determine, that removal of tiny portions of paint or alteration to the paints of less than 0.1% of the paint on the underlying surface of the art will still be considered reversible.

A "suspension" comprises solid particles that are dispersed in a liquid.

A "colloidal suspension" is one in which the mean size or diameter of the particles suspended in a liquid is between 1-1000 nm.

A "colloidal dispersion" is a system in which particles of colloidal size of any nature (e.g. solid, liquid or gas) are dispersed in a continuous phase of a different composition (or state).

An "emulsion" is a mixture of two or more liquids that are normally immiscible (non-mixable or un-blendable).

The term "water-dispersible" in the context of a water-dispersible polymer means that the polymer can be mixed into water (or an aqueous carrier) with the aid of a surfactant or other dispersal aid to form a stable mixture of the solid polymer in water. For example, a stable dispersion will not separate into solid and liquid phases over a period of at least 2 weeks when stored at 49° C. (120° F.), or when physical force (such as vibration, for example) is applied.

ASTM (American Society for Testing and Materials) Standards include test methods, specifications, accepted practice, and accepted terminology for materials, products, systems and. services.

The terms "modulus," "elastic modulus," or "modulus of elasticity, or Young's modulus" are used here interchangeably to mean the stiffness of the material, or more specifically, the modulus is the amount of force needed to deform a material a set amount. Modulus is measured in psi (pounds per square inch). Modulus can be measured in any mode of deformation, i.e., tension (stretching), compression, (crushing), flexing, (bending), or torsion (twisting).

The term "Elongation-to-break" is defined as the length at breaking point expressed as a percentage of its original length (i.e. length at rest) e.g. if a rubber reaches twice its length before breaking its elongation is 100%. ASTM Method 214 will be used to determine the elongation-to-break of the materials in the present context.

The term "Hardness" will be defined by a Sward type of device. A Sward-type rocking instrument for measuring the hardness of surfaces, particularly of paint films or coatings, comprises two identical flat metal rocker arms, in the form of discs or rings, connected side by side by spacer elements and having a weight mounted eccentrically there between. In some constructions the distance of the weight from the axis of the rings can be adjusted to vary the period of oscillation of the instrument. When such an instrument is set rocking on a surface, the amplitude of its motion will decrease and will eventually reach zero when the rocker comes to rest, the rate of decrease in amplitude being a measure of the hardness of the surface. ASTM Method D2134 will be used to measure coating hardness.

"Moisture Vapor Transmission Rate" (MVTR) is defined as the rate at which water vapor, under a specified relative humidity gradient (100% to 33%) can pass through a material of a standard thickness. The most common standard international (SI) unit for the MVTR is $g/m^2/day$. In the USA, $g/100\ in^2/day$ is also in use, which is approximately $\frac{1}{15}$ of the value of SI $g/m^2/day$ units. (More precisely, the ratio is 1/15.500031, or very close to 2/31.) Typical MVTRs in aluminum foil laminates may be as low as 0.001 $g/m^2/day$, whereas the rate in fabrics can measure up to several thousand $g/m^2/day$. In the present context ASTM method E96 (Standard Test Methods for Water Vapor Transmission of Materials) will be used to determine the MVTR of the materials described herewith.

A "Thickener" is an additive used to increase a coating's viscosity.

The term "components" refers to any part of a composition or coating that includes a particular feature or structure. Examples of components include polymers, buffers, pH regulants, and other organic materials that contribute either to film formation or its modification, performance, longevity, resistance to biological attack, etc.

The term "thermoplastic" refers to a material that melts and changes shape when sufficiently heated and hardens when sufficiently cooled. Such materials are typically capable of undergoing repeated melting and hardening without exhibiting appreciable chemical change. In contrast, a "thermoset" refers to a material that is cross-linked and does not "melt."

The terms "poly acidic" and "polycarboxylic acid" includes both polycarboxylic acids and anhydrides thereof.

The term "on", when used in the context of a coating applied on a surface or substrate, includes both coatings applied directly or indirectly to the surface or substrate. Thus, for example, a coating applied to a primer layer overlying a substrate constitutes a coating applied on the substrate.

The term "substrate" is any surface, whether painted or unpainted.

Except as otherwise indicated, the term "weight percent" or "wt %" refers to the concentration of a component or composition based on the total weight of the composition, expressed as a percentage. Except as otherwise indicated, the term "parts by weight" refers to the concentration of a component or composition based on the total weight of the composition.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, "a," "an," "the," "at least one," and "one or more" are used interchangeably. Thus, for example, a coating composition that comprises "an" additive can be interpreted to mean that the coating composition includes "one or more" additives.

As used herein, a "buffer" is a composition comprising a weak acid and its salt or a weak base and its salt. A buffer as used herein, typically has a minimum concentration of 0.5M.

Also herein, the recitations of numerical ranges by endpoints include all numbers subsumed within that range (e.g., 1 to 5 includes 1, 1.5, 2, 2.75, 3, 3.80, 4, 5, etc.). Furthermore, disclosure of a range includes disclosure of all subranges included within the broader range (e.g., 1 to 5 discloses 1 to 4, 1.5 to 4.5, 1 to 2, etc.).

While the invention will be discussed in connection with certain preferred embodiments, it is not intended to be so limited. On the contrary, the invention is intended to cover all alternatives, modifications, and equivalents as may be included within the spirit and scope of the invention as defined by the appended claims.

An embodiment of the invention provides for a clear coating composition for protection of substrates, as described above, to impart a specific pH at which the film will be reversible in an aqueous preparation, for example in an aqueous buffer. The coating composition is applied to the substrate as an aqueous preparation and allowed to dry.

However, the coating composition is also removable, that is, the coating composition is removable under certain pH conditions in aqueous preparations, for example in aqueous buffers, as well, allowing the removal of the coating composition should the need arise.

The volatile base, acrylic film-forming polymer, compatibilizing polymer and polyacidic polymer used in the present invention can be those described in WO 2014/143705, which is incorporated herein by reference. The process for preparing the composition of the invention, and the methods in which the composition of the invention can used, can similarly be those processes and methods set out in WO 2014/143705.

An aqueous medium is required because of ever increasingly stringent volatile organic compound (VOC) requirements for coatings and paints in the outdoor urban environment. As reversibility is also required for a coating applied to works of art, some form of aqueous removal method is advantageous. The water reversibility of compositions disclosed in the present disclosure is imparted by a poly acidic polymer incorporated into a film-forming acrylic resin dispersion. Accordingly, VOC of the disclosed compositions is usually below 50 g/L.

A volatile base or pH regulant is used in the present invention to raise the pH in a temporary fashion, help stabilize the primary film forming acrylic dispersion, and help solubilize other weakly acidic materials incorporated into the film. The preferred base is ammonium hydroxide, but other organic basic materials, although less preferred might include, but not necessarily limited to, ethanolamine, diethanolamine, triethanolamine and various other ethylic and methylic primary, secondary and tertiary amines.

The film-forming acrylic polymer is a polymer generally having the following properties: good film forming properties when dried from stable aqueous dispersions, general aesthetic and physical properties that match closely to those of the mural paints they are applied to, and good aging and weathering properties, and appropriate 'handling' or application characteristics. These polymers include polymers in aqueous dispersion or 'latex' form and may include styrene/acrylic emulsions, acrylic emulsions, polyester emulsions or mixtures thereof. A preferred polymer dispersion is the family of acrylic dispersions that contain polymers of EA-MMA or BA-MMA structure or variations of the same. Examples of specific acrylic latex emulsions suitable for use herein include Polynt's Aquamac 575, Aquamac 510, BASF's Acronyl 4110, Acronyl 4220, Acronyl 4670, Dow's Rhoplex VSR-50, Rhoplex® HA-12 & Rhoplex® 1-2074 available from Rohm & Haas, Co. Examples of styrene/acrylic latex emulsions include Acronal S728, Acronal NX4533 and Acronal S888S from BASF. Water based acrylic or styrene/acrylic emulsions may be self-crosslinking and/or alkali soluble and supplied on the acid side (un-neutralized). The component parts of these examples are known to a person of ordinary skill in the art. Preferably these acrylic latex emulsions do not include PFOA's or other perfluorinated compounds. Typically, the film-forming polymer is water-insoluble upon forming a dried coating.

The poly acidic polymer is preferably an acrylic resin which comprises at least one vinyl or vinylidene moiety having a carboxylic acid group capable of salt formation. The acrylic resin may comprise of at least one vinyl or vinylidene moiety having a carboxylic acid group capable of salt formation and at least one alkyl acrylate or alkyl methacrylate moiety. The acrylic resin also may comprise of at least one vinyl or vinylidene moiety having a carboxylic acid group capable of salt formation, at least one alkyl acrylate or alkyl methacrylate moiety, and at least one other vinyl or vinylidene moiety co-polymerizable with a) the alkyl acrylate or alkyl methacrylate moiety and b) the vinyl or vinylidene moiety having a carboxylic acid group capable of salt formation. Further, the acrylic resin may comprise of at least one vinyl or vinylidene moiety having a carboxylic acid group capable of salt formation and at least one other vinyl or vinylidene moiety co-polymerizable with the vinyl or vinylidene moiety having a carboxylic acid group capable of salt formation. Typically, the poly acidic polymer is water soluble upon forming a dried coating.

Preferably, the poly acidic polymer is an acrylic resin which is comprised of: (1) from 20 to 85 percent by weight of at least one alkyl acrylate or alkyl methacrylate moiety; (2) from 80 to 15 percent by weight of at least one vinyl or vinylidene moiety having a carboxylic acid group capable of salt formation; and (3) from 0 to 30% percent by weight of at least one other vinyl or vinylidene moiety copolymerizable with (1) and (2). For example, polymers include cellulose acetate phthalate, methacrylate-base polymers, cellulose acetate, trimellitate, hydroxypropyl methylcellulose phthalate, and similar polymers. In a particularly preferred embodiment of this invention, the alkyl acrylate (1) is ethyl acrylate, and the vinyl moiety (2) is methacrylic acid. Evonik's Eudragit L 100-55, L-100, and S-100 resins are examples of a copolymer systems meeting this definition.

A compatibilizing polymer has the following properties: this polymer must exhibit miscibility with both the primary film former and the poly acidic polymer incorporated in it to yield a specific pH reversibility aspect to the coating. The compatibilizing polymer exhibits this miscibility in the aqueous preparation. It is particularly preferred that the compatibilizing polymer is a polyoxazoline, and more particularly is poly (2-ethyl-2-oxazoline), Examples of suitable compatibilizing oxazoline polymers include poly (2-ethyl-2-oxazoline), poly (2-methyl-2-oxazoline), and poly (2-isopropyl-2-oxazoline), or combinations thereof It is further understood that certain further functional materials may be added to the clear coating, including but not limited to a coalescence material, a UV stabilizer, a de-foaming agent, an anti-corrosive agent, a flattening or matting agent, a colorant, an agent to protect from temperature swings, and/or antimicrobial agents.

The compositions of the invention may optionally include an alkaline swellable thickener. In this regard, the most common examples of currently available thickener compositions are often based on alkali swellable carboxylated polymers. Variations of these compositions are known in the art and usually begin to thicken, become transparent, and fully hydrated only above a pH of 7.0. Examples of viscosity modifiers include alkali-swellable acrylic thickeners, such as Acrysol® ASE-60 (available from Rohm & Haas), Acrysol® ASE-75, Rheolate® 450 and Rheolate® 420, and associative thickeners, such as Elementis Rheolate®255, Rheolate® 216 and Rheolate® 1.

In its present embodiment the coating typically dries by evaporating water, and not by cross-linking or other chemical reactions. The absolute drying time of the coating will depend on weather or atmospheric conditions around the coating. It is possible to apply the coasting with a brush or roller, spray gun, etc. (common methods of application of paint or varnish). The pH of the liquid coating is between 6-12, and typically between 8-9, and on drying the pH of the dried coating may decrease from this range with time as the volatile base or pH regulant evaporates away. We have determined experimentally that the swelling and loss or disruption of materials from underlying acrylic paints is primarily a function of pH (the lower the pH the less swelling and loss of extractive materials from acrylic paints), the conductivity or ionic concentration of aqueous materials brought to the paint surface (aqueous preparations that exhibit a total overall conductivity above 10 mS/cm tend to minimize swelling in acrylics), and specific ion effects( solutions containing $SO_4^{-2}$, $Ca^{+2}$ for instance, can minimize swelling in acrylics). All three of these effects are incorporated into the aqueous coating preparation to minimize the impact of application of the coating on the underlying paints. These three effects would also be used in any aqueous preparation used to remove the coating as well. For instance, the three effects would be controlled in any aqueous buffers used to remove the coating from a painted acrylic surface.

Once the clear coating dries, the swelling subsides as the water is removed from the surface. The clear coating results in a dry surface that is clear, hard (equivalent to 10-20 Sward units, and well adhered to the paint and substrate materials it has been applied to). The film thickness of the coating can vary, but the preferred thickness is between 10-20 microns. However, suitable thicknesses are between 1 and 1000 microns. At this thickness the inherent moisture vapor transmission rate (MVTR) should be close to that of the acrylic paints that the coating is applied to (120 g/m$^2$/day). The coating should also exhibit mechanical properties that are compatible with the underlying paints (e.g. exhibit a Young's Modulus of 2.63 MPa or less; an elongation-to-break of between 50-60%, and an overall breaking strength of 0.6 MPa or less). Moreover, the coating is reversible with water, for example in an aqueous buffer, at a specific pH (determined by a poly acidic polymer incorporated in the coating).

Once dry, the coating will remain on the substrate through rain and other elements. The nominal pH of acidic rain is between 4.2 and 4.4; 'clean' rain typically will have a pH of 5.6. In its preferred embodiment the present invention should be reversible at pHs higher than these levels to insure the coating integrity under normal weathering conditions, but ease of removable from underlying coatings or paints at pHs of 7 or above. These washing or reversing solutions, which may be aqueous buffers, have typically been made with either citrate or phosphate buffered preparations at pH 7 (potassium dihydrogen phosphate 0.5M and citrate 0.5M) or pH 8 (citrate 0.5M, 0.5M triethanolamine), However any aqueous solution buffered to an appropriate pH will suffice if it also includes a weak chelating material in it (e.g. citrate above a pH of 6.5).

In certain preferred embodiments, the clear coating composition is comprised of water, a volatile base, a film-forming acrylic polymer, a compatibilizing polymer, specifically poly (2-ethyl-2-oxazoline), and a poly acidic polymer that has a specific pH at which it passes from insoluble to soluble that is particularly suitable for the protection of outdoor fine art murals and building substrates. Said coating is additionally both water applied and water reversible or re-soluble under specific pH conditions.

In further embodiments, additional functional materials may also be included in the coating to enhance overall performance. Examples of these other materials might be: coalescence materials to aid in film formation, UV stabilizers to help increase coating life and protect the acrylic paints that the film covers, de-foamers to aid in film formation free of bubbles, 'flatting' or matting agents to alter gloss, and anti-microbials to extend shelf life.

A further property of the film-forming acrylic polymer is its glass transition temperature ($T_g$). As a general rule, acrylic binders which possess relatively high $T_g$'s (above ambient temperatures) will provide a greater degree of gloss to a coating, and a greater degree of hardness and increased mechanical strength. However, this is negated, for purposes of the present invention, by a decrease in the flexibility of the film, which leads to cracking of the film when flexed, or when applied over artist's acrylic paints that, have a much lower $T_g$ than the acrylic polymer itself. Artist's acrylic paints are generally proprietary mixtures, but one example of such an acrylic film-forming polymer commonly used in water dispersed artist's acrylic paints is Dow Chemical's AC 2235, a co-polymer of butyl acrylate/methyl methacrylate, which has a nominal $T_g$ of 13° C. In terms of the present embodiment, the acrylic polymer comprising the bulk of the coating as a film-former, when combined with the other materials in the coating must exhibit a $T_g$ close to this temperature (and preferable less) to avoid cracking when flexed or applied over common acrylic artist's paints.

Typically, when two or more immiscible polymers are mixed together the new compositions still tend to exhibit two distinct $T_g$'s commensurate with the individual polymer components. Polyoxazolines such as poly (2-ethyl-2-oxazoline), poly (2-methyl-2-oxazoline), and poly (2-isopropyl-2-oxazoline) are unusual in this regard in that they often form miscible blends with other polymers and raise or lower the $T_g$ of the other polymer and do not exhibit a separate, distinct $T_g$ themselves. The nominal $T_g$ for poly (2-ethyl-2-oxazoline) used in the present invention is 70° C. (e.g., Polymer Chemistry Innovations Aquazol 200), although this number is usually lowered substantially by the presence of water absorbed onto poly (2-ethyl-2-oxazoline). When blended at low concentrations with respect to the film forming acrylic resin, the $T_g$ of the acrylic resin is usually lowered, and the polyoxazoline acts more like a 'plasticizer' or 'solvent-like' material in its effect on the film forming acrylic. In the present invention, the optimal weight ratio of film forming acrylic polymer to poly (2-ethyl-2-oxazoline) is 12.3:1. At this ratio, experimental $T_g$ of the resultant acrylic film was between −20° C. and 20° C. depending upon the acrylic film-forming polymer used.

Polyoxazolines can act as a 'compatibilizing polymer' by helping to bring together polymers that are mutually insoluble in one another by being miscible with both. Poly acidic polymers have a limited miscibility with acrylic film-forming polymers, and would be poor film formers by themselves; but polyoxazolines can create stable blends of poly acidic polymers in the acrylic film forming polymer.

In addition to the glass transition temperature, the particle size of the acrylic polymers also affects the gloss of the film. Generally, the larger the resin particle, the lower the gloss of the resulting film. Although various acrylic polymers may be used in the compositions of the present invention, such polymers, when used in combination with the other components of these compositions, should be able to provide the resulting film with the desired visual characteristics (high transparency or clarity, the dried film should be less than 0.5 NTU units), low inherent color (less than 5, as measured by ASTM method D1209 using a platinum-cobalt color scale for yellowness), the highest color saturation of underlying paints (greatest increase in ΔE value based on Hunter Lab's CIE L*a*b* color coordinate space), and a with a gloss value less than 20 units. The acrylic film forming material should also provide for 'optimal' mechanical properties. 'Optimum' will be defined in this context as determined by the acrylic paints the coating will likely be applied to. The average breaking strength for well-aged (4 months old) Golden Acrylic Heavy Bodied paints was found to be 0.58

MPa; the average Young's Modulus was 2.6 MPa, and the average elongation-to-break was 56%. Any coating that might be applied over acrylic paints should ideally have a similar (i.e. within about 25%) or slightly lower modulus (be more flexible, less 'stiff' mechanically), have an elongation-to-break about the same as the underlying acrylic paints (stretch as much or more than the underlying paints), and have a tensile or breaking strength less than that of the underlying acrylic paints (fail before the paints do under applied force). An overall hardness of between 5-10 Sward units would also allow some durability of the coating to impact driven soils. The average MVTR through Golden Acrylic Heavy Bodied paints, with an average layer thickness of 30 microns, is about 120 g/m$^2$/day; a practical coating at about a 10-20 micron film thickness should have an MVTR that is similar or greater than this value in order to also be compatible as a protective coating over paint.

In many commercial formulations, such polymers are typically provided in the form of an aqueous suspension, dispersion, or emulsion. In such cases, an appropriate amount of dispersant and/or emulsifier is also present in the aqueous acrylic polymer combination. On drying, these materials should generally provide a resistance to re-solubilization when re-wet with water. An example of such a commercially available aqueous acrylic polymer dispersion that may be advantageously used in the composition of the present invention includes the acrylic dispersion manufactured by Polynt Corporation and sold under the name 'Aquamac 575'. This material has a glass transition temperature of about −5° C. and a pH of 8.5. The Polynt acrylic dispersion is proprietary, but nominally contains about 45.5 wt. % acrylic resin solids, water, an undisclosed amount of a surfactant, and a base.

Additionally, any water soluble or water dispersed coating material intended for exterior application still must meet low VOC regulations (50 g/L VOC up to 150 g/L VOC). The Polynt Aquamac 575 all acrylic dispersion exhibits an especially low coalescence demand; at 55° F. or higher no additional coalescent is needed; between 40°-55° F. a minimum of 3% w/w coalescent material is needed to form a film or coating with this resin (at 70% RH), and the Polynt Aquamac 575 easily meets the 50 g/L VOC range cited above at low temperature applications (40° C.) at the 3% w/w coalescent level.

The present coating invention will also include specifically a poly acidic polymer whose solubility is pH dependent. Poly acrylates co-polymers and trimers have long been used as enteric coating materials for just this purpose. The pH reversible value is determined by the density of the polyacrylate groups in the polymer, the specific monomers which comprise the polymer, and the molecular weight of the polymer. Examples of polyacrylate structures that will permit re-solubilization at higher or lower pH values include but are not limited to: Evonik's Eudragit LE-100 (Poly(butyl methacrylate-co (2- dimethylaminoethyl) methacrylate-co-methyl methacrylate), MW 47K, Monomer Ratio 1:2:1 (BMA-DMAE MA-MA) and soluble in the pH range of 1-5; Eudragit RL-100-55 Poly(methacrylic acid-coethylacrylate), MW 320K, monomer ratio of 1:1 (MA-EA) which is soluble above a pH 5.5; Eudragit L-100 Poly(methacrylic acid-coethylacrylate), MW 125K MW, monomer ratio 1:1 (MA-EA) soluble above a pH of 6; Eudragit S-100 Poly (methacrylic acid-coethylacrylate) , MW125 K, monomer ratio: 1:2 (MA:EA) soluble above a pH of 7.0. Lubrizol's Avalure UR-450 polyurethane dispersion, (PPG-17/IPDI/ DMPA tri-polymer (Polypropylene glycol- isophorone diisocyanate-2, 2,-dimethylolpropionic acid) is an example of an additional material (apart from the poly acrylates cited above) that may also be used as a pH sensitive or reversible polymeric material in the present invention and that is re-soluble in the pH range of 8-10. In addition to exhibiting specific pH solubility properties, the Evonik Eudragit resins tend to have relatively high MVTRs inherently, and tend to impart some of this high moisture vapor transmissivity to film-formers that they are blended with. The LE-100 resin has an inherent MVTR of 350 g/m$^2$/day; the RL-100-55 is 100 g/m$^2$/day; the L-100 is 450 g/m$^2$/day; and the S-100 is nominally 250 g/m$^2$/day.

Polyoxazolines are generally hydrophilic, water-soluble materials. In this application, poly (2-ethyl-2-oxazoline) is described as a compatibilizing polymer, or compatibilizer. Poly (2-ethyl-2-oxazoline) provides for some hydrophilicity, water vapor transmission, and even water reversibility when blended with water insoluble film-formers such as acrylics and is used in this context for all of those effects. Polyoxazolines have also proven useful as adhesion promoters and viscosity modifiers in similar applications. Furthermore, in the blended coating, poly (2-ethyl-2-oxazoline) is not as hygroscopic compared to other commercial water soluble polymers including polyvinyl alcohol and polyethylene oxide, and thus poly (2-ethyl-2-oxazoline) possesses significantly greater dimensional stability in ambient humid atmosphere compared to these other polymers.

By themselves, such polyoxazolines when formed into films exhibit very poor mechanical properties and show sensitivity to atmospheric moisture. See, for example U.S. Pat. No. 4,547,530. Dried films of poly (2-ethyl-2-oxazoline) on their own would be too brittle at low RHs and temperatures to be useful in most applications. Indeed, U.S. Pat. No. 4,547,530 addresses that continued exposure to aqueous conditions or materials would tend to erode films made entirely of poly (2-ethyl-2-oxazoline). Despite these mechanical problems which limit the utility of polyoxazoline polymers by themselves, said polymers have many desirable properties such as hydrophilicity when blended or alloyed with other miscible polymers which would be advantageous in many solid articles such as coatings. It would therefore be desirable to prepare a coating containing polymers which exhibit good mechanical and physical properties along with a polyoxazoline to allow for, or aid in, additional swelling and re-solubility with aqueous materials under desirable or preferred conditions. Polyoxazolines have previously been employed in small amounts as additives in essentially water-insoluble polymer compositions for just this effect. Polyoxazolines have been, for instance, blended with poly olefins as immiscible blends that retain some added surface hydrophilicity. Blends or alloys of polyoxazoline and other co-miscible polymers have been used as anti-soiling or anti-stats, to further enhance surface performance properties, see, for example U.S. Pat. No. 3,574,784 and Patent Abstracts of Japan, vol. 6, no. 11, (C-88) (889), (JP-A-56 136 844) of Jan. 22, 1982.

A further embodiment of the present disclosure relates to a coating blend which includes a polyoxazoline (of the type derived from a linear polymer obtained by ring opening of a 2-oxazoline and/or a 2-oxazine, specifically poly (2-ethyl-2-oxazoline)), and the 'bulk' or major film forming acrylic resin, and the other coating constituents (the pH sensitive poly acidic material, and any thickeners used). Examples of commercially available poly (2-ethyl-2-oxazoline) resins are Aquazol 200, and Aquazol 500 (Polymer Chemistry Innovations) with MWs of 200 kDa and 500 kDa respectively. Exemplary polymers which might also be useful in this context, and which form miscible blends with poly (2-ethyl- 2-oxazoline) in a wide range of proportions include certain styrene/acrylonitrile copolymers; rubber modified styrene/acrylonitrile polymers; phenoxy resins and certain styrene/acrylic acid copolymers. Polymers which form miscible blends with poly (2-ethyl-2-oxazoline) in a narrower range of proportions include, for example, polyvinylidene chloride; copolymers of vinylidene chloride and vinyl chloride; and styrene/acrylic acid copolymers containing small amounts of acrylic acid. In the present context, the poly (2-ethyl-2-oxazoline) can be thought of, in addition to being a film former, a 'compatibilization' agent, that is, by itself it would make a poor film forming material, but it can mix with, and increase the miscibility of polymers that have inherently a poor ability to be blended together such as the poly acidic (pH sensitive) materials described above, with the 'bulk' acrylic resin film-former.

In embodiments of the invention involving a second or subsequent coating composition, the second or subsequent coating composition can contain a thickener. Although such thickeners can be added to the coating compositions disclosed herein, the advantageous type and amount of thickener will be determined by the properties desired in both the application as well as the post-application properties of the composition. For example, sufficient thickener is advantageously added to enable a composition to manifest the visual, mechanical, and solubility properties outlined above. In this way, the resulting fully dried composition will possess well defined and useful coating or film forming properties. Conversely, the amount of thickener in the composition is advantageously limited such that, if desired, the composition can be brushed or sprayed onto a painted or unpainted surface. Accordingly, the composition preferably possesses a viscosity of from about 60,000 cps to about 110,000 cps. For purposes of the present disclosure, all viscosities will be provided as measured on a Brookfield viscometer. Most preferably, the viscosity of the composition will range between about 90,000 cps and about 110,000 cps. Although any thickener can be used in the above embodiments, acrylic acid polymers or copolymers are advantageously utilized therein. Acrysol TT-615 and Acrysol ASE-60, which are acrylic copolymer emulsions available from Dow, are examples of preferred thickeners. The ASE-60 thickener may be described as a hydrophobically modified alkaline swellable emulsion (HASE).

Preferably the range of acrylic resin film-former is between 30-90% (preferably between 40-80%, the most preferred being 50-80%); the poly (2-ethyl-2-oxazoline) compatibilizer is between 5-50% (the most preferred being (5-20%); the poly acidic polymer is between 0.1-30% (preferably between 1-30%, the most preferred being 5-25%) of the total film weight. Preferably the range of acrylic resin film former is between 40-80% (the most preferred being 60-80%); the poly (2-ethyl-2-oxazoline) compatibilizer is between 5-50% (the most preferred being (5-30%); the polyacrylic acid poly acidic polymer is between 1-30% (the most preferred being 5-25%) of the total film weight. In these relative proportions the film reversibility follows closely to the manufacturer's stated reversibility pH for the specific poly acidic polymer used. For instance if the poly acidic polymer used is Evonik's Eudragit S-100 resin, a film which used his specific poly acidic polymer will be dissolved at a pH of 7.0 or above.

In further embodiments, it is advantageous to apply multiple coating application layers to tailor the pH reversibility of each layer by incorporating specifically into each layer a poly acidic component that will dissolve at a pH that are at least 0.5 pH units apart. This allows for the selective removal of one coating layer from another by carefully controlling the pH of applied cleaning solutions. An outer coating layer therefore might be removed and/or replaced without disruption to underlying coating layers.

For example, in a particular embodiment, a method of covering or coating a substrate comprises a first coating which is capable of being re-solubilized at a pH of 8.0 or above. A second coating is applied on top of said first coating which is capable of being re-solubilized at a pH of about 7.0. Accordingly, the outermost coating is capable of being re-solubilized at a different pH than the coating below. This provides that the outer coating may be removed from the substrate while leaving the first coating in place. Neither coating would be affected by contact with either acid rain (pH 4.2-4.4) or 'clean' rain (pH 5.6), or even with water, without the sufficient buffering capacity to remove the poly acidic polymer.

In certain circumstances, for example, a painted mural is coated with the first coating capable of being solubilized at a pH of 8.0 and a second coating capable of being re-solubilized at a pH of 7.0. The mural is defaced by paint, marker, but is also soiled by dirt, smog and other pollutants. To clean the mural, the second coating, being capable of being re-solubilized at a pH of 7.0, can be removed, and will also remove the defacing materials, the paint, marker, dirt, smog, etc. Accordingly, an aqueous solution, for example an aqueous buffered solution, is prepared having a pH of about 7.0 and is applied to the mural. The second coating solubilizes and is removed, while the first coating remains on the mural. After the second coating is removed, a new application of the second coating can be applied to allow for future cleaning of the mural paint surface. In other embodiments, an outer layer may have a pH that is lower than an adjacent underlayer.

It may be necessary, in some circumstances for the difference between the first coating and the second coating to be more than 0.5 pH, and thus, it may be appropriate to modify one or both compositions so that the compositions are about 1.0 pH apart in the pH for re-solubilization. In further embodiments, three or more coatings may be applied to a substrate, allowing a third and a second layer of a coating to be removed while leaving a first coating on the substrate.

In certain embodiments, coating compositions, while advantageously colorless or clear as a protective coating (as determined in the absence of coloring agents such as pigments or dyes in the compositions), may nevertheless be successfully used as a restoration color or paint/glazing material as well by including pigments, dyes, or other colorant or visual effects materials within the composition. Furthermore, poly (2-ethyl-2-oxazoline), and a poly acidic polymer (pH specifically reversible), can be blended into a commercial colored film-forming latex paint (pigmented latex paint such as Valspar Interior Latex) so as to impart a specific pH at which the commercial latex paint will be reversible in an aqueous buffered solution. However, the pigmented paint composition is also removable, that is, the pigmented paint composition is removable under certain pH conditions in aqueous buffers, allowing the removal of the pigmented paint composition should the need arise. Otherwise, in embodiments, instead of a clear composition, pigments, dyes, colorants, or visual effect materials can be directly added into the composition, yet the entire composition remains removable under the specific pH buffer as described herein. The pH of the buffer used to remove the paint may be at least 6, at least 7, for example between pH 7 and pH 10. For instance, the paint may be removed by an aqueous buffer of a concentration of greater than 0.5M with a pH of between 7 and 10. Thus the present invention provides a latex paint comprising a compatibilizing polymer as defined herein and a polyacidic polymer as defined herein. Preferably, said latex paint is removable, such that when the latex paint is applied to a substrate it can be removed from said substrate using an aqueous buffer as defined herein.

Accordingly, a preferred embodiment is a method of forming a removable latex paint, comprising blending into a latex paint a sufficient amount of a polyoxazoline and a sufficient amount of a poly acidic polymer. The specific quantities of each component and the specific components themselves yield a pigmented latex paint that is reversible at a specific pH using an aqueous buffer. For example, upon addition, the latex paint comprises between 0.1 and 30% by weight of the poly acidic polymer, and wherein the latex paint comprises between 5 and 50% by weight of the compatibilizer. This results in the latex paint comprising an amount of the latex material in the latex paint as the acrylic film-forming polymer of 30-90% by weight of the composition.

In certain embodiments, the invention comprises a polyacidic acid polymer and a compatibilizing polymer suitable for adding to a latex based paint formulation to impart reversibility to the latex based paint. Accordingly, use of a composition comprising a polyacidic acid polymer and a compatibilizing polymer, wherein said composition is admixed to a commercial latex paint to impart reversibility to the commercial paint is indicated. In other embodiments, the latex based paint is formulated commercially inclusive of the poly acidic acid polymer and the compatibilizing polymer to impart reversibility with an aqueous buffer.

Further embodiments are directed towards use of a pigmented latex paint, for providing reversible pigmented latex paints for use in covering a surface with pigmented latex paint.

Further embodiments are directed towards a pigmented latex paint, comprising an aqueous medium, a volatile base, an acrylic film-forming polymer, a compatibilizing polymer (polyoxazoline), and a poly acidic polymer, and wherein said composition is capable of being applied to a substrate using aqueous means and removed from said same substrate using an aqueous buffer at a specific pH. In preferred embodiments the latex paint comprises between 0.1 and 30% by weight of the poly acidic polymer, and between 5 and 50% by weight of the compatibilizer. This results in the latex paint comprising an amount of the latex material in the latex paint as the acrylic film-forming polymer of 30-90% by weight of the latex paint.

Any material which is compatible with the other components of the system and which maintains the pH within the desired range may serve as a pH regulant. However, the volatility of the pH regulant affects the time required for the binder film to coalesce and for the coating to dry. Thus, the use of a pH regulant which does not have sufficient volatility can produce a coating which dries too slowly so that the formation of a continuous film is inhibited. The most preferred pH regulant for the coating preparation is ammonium hydroxide, but other organic amines such as ethanolamine, diethanolamine, triethanolamine, and methylenic or ethylenic amines as primary, secondary, tertiary amines etc. are less preferred, but may replace ammonium hydroxide ion in this invention.

In certain embodiments, to enhance the manufacture of clear coating compositions described herein, a de-foamer may be used. One de-foamer is Nalco 2305 Antifoam (a mixture of polyglycol, polysiloxane, polyglycol esters, a paraffinic solvent and water), manufactured by Nalco Chemical Company. This de-foamer is found to work well in the compositions described herein when used in amounts of up to about 0.1 to 2.0 wt. % of the final film weight. Other possible de-foamers might also be: Tego 8030, or 805, Foammaster VL, BYK-024, Surfynol DF-75, or Foamstar A-34.

In other embodiments, a HALS (Hindered Amine Light Stabilizer) can be added to clear coating compositions to increase film life and aid in the protection of underlying acrylic paints. Such a HALS type of stabilizer must be miscible with the other coating components once dried, and not alter any of the properties of the said film such as a high MVTR, clarity, or water reversibility of the film. BASF's Tinuvin 123-DW is an example of such a HALS material that is pre-dispersed in water and easily blended with the other ingredients in the present invention. The range of the BASF material in the present invention is 0.02-0.5% of dried film weight, but most the most preferred concentration is 0.05 wt. % of the final dried film weight to retain clarity in the present invention.

To maintain the shelf life of the compositions, one or more preservatives may be added. Preservatives serve as biocides and fungicides and may be added in any effective amount, though a typical concentration range is up to about 5 wt. %. The use of preservatives in levels greater than about 5% by weight may cause the coating to become toxic or unstable and may, in any event, be unnecessary. Any conventional preservative may be utilized in the invention as long as there is compatibility with the remaining coating components. For example, preservatives manufactured by Troy Chemical and sold under the name Troysan Polyphase, (i.e., xylene, cumene, trimethyl benzenes, dipropylene glycol and dimethyl sulfoxide), work well in compositions of the invention. Additionally possible materials might include: Nuosept 95 (a bicyclic oxazolidines solution manufactured by HULS America Inc. of Piscataway, N.J.), and Dow's ROZONE 2000 or ROCIMA 20.

To protect coating compositions as described in the various embodiments exposed to very low temperatures, a freeze/thaw protector may be used. One preferred freeze/thaw protector is propylene glycol, which is effective when used in amounts up to about 10% by weight, with the most preferred range being from about 1.5% to about 3.0% by weight.

Where low temperature (here defined as 40° F. to 55° F.) applications of the coating may be necessary up to 3.0 wt. % of the film weight of a coalescent similar to Eastman Texanol ester alcohol may be used. Said coalescence agent may not be needed in the present composition at higher application temperatures (greater than 55° F.). The minimum film formation temperature (MFFT) for the Polynt Aquamac 575 acrylic dispersion is nominally −2° C. (28.4° F.). But it has been our experience that a coalescence aid of one form or another is needed until the application temperatures reaches at least 12.7° C. (55° F.). Above that temperature and the acrylic dispersion forms continuous films with useful mechanical properties.

In further embodiments, the addition of an anticorrosive agent material can be utilized to prevent corrosion on metallic substrates. Furthermore, certain anticorrosive agents further impart both anticorrosion properties as well as adhesive properties towards metal substrates. For example, when admixing either a clear coating or a pigmented coating, an anticorrosive agent such as benzotriazole can be utilized in a percentage of between about 0.1 and 10% to impart anticorrosive and adhesive properties towards a metal substrate. Most preferable a composition comprising the anticorrosive material comprises between about 0.1 and 5%, or between about 0.1 and 2.5%.

Preferred materials for anticorrosive properties include an alkaline medium stable inhibitor of any of the primary three types (anodic, cathodic, or mixed inhibition) which can be considered for inclusion as an anticorrosive agent. Preferably, materials for transparent coating applications might include water soluble materials of the alkyl-amine type (e.g., methylamine; dimethylamine; ethylamine; propylamine; cyclohexylamine; triethylentetramine (TETA), or hexamethylentetramine (EMTA), or similar); alkyl amino alcohols (e.g., monoethanolamine (MEA); triethanolamine (TEA); dimethyl ethanolamine (DMEA); methyldiethanolamine (MDEA), or similar. See Dow's Correguard series of inhibitors); alkyl aryl alcohol amines (e.g., 2-(methyl(phenyl)amino)ethanol, 2,2'-(phenyl azanediyl)diethanol, or and 2-(phenylamino)ethanol, or similar); and mono- , oligo-, and poly-carboxylate salts, (e.g). Combinations or mixture of polymeric poly-carboxylates, with azoles, molybdenum, and nitrite and nitrate salts, phosphates, stabilized silicates and transition metal compounds might also be considered. This is not an exhaustive list, but meant to illustrate some of the organic and mixed organo-metallic materials that might be considered useful in clear coating applications.

By contrast, complex- or film-forming materials that are metal substrate specific (e.g., triazoles like benzotriazole as a copper corrosion inhibitor; tannates as iron specific materials, etc.) might be included in the potential list of useful inhibitors. When the present invention is used as a pigmented (i.e., in a 'paint' or 'pigmented' or 'opaque' type of application), any of the common inorganic inhibitors might be considered (e.g., chromates, silicates, stannates, zinc oxide, etc), individually or as salts of organo-nitrogens (e.g. Alcophor 827), or together with anti-corrosive pigments, or corrosion inhibitors such as Anticor 70, Albaex, Ferrophos, and Molywhite MZAP could be utilized as understood by those of ordinary skill in the art.

In certain further embodiments, it may be advantageous to apply a non-removable coating to a substrate before addition of one of the coatings described in the embodiments herein. The application of such a non-removable coating, such as a polyurethane or similar clear coating, would become part of the substrate or artwork, as it may be. Then removable coatings, as described in the embodiments herein, may be advantageously added on that non-removable coating, providing that the art under such non-removable coating is protected from the elements by multiple layers of material. However, by applying a removable coating on top of the non-removable coating, should the substrate be defaced, or weather due to UV or other effects, the removable coating may be removed and re-applied as appropriate, without damaging the underlying art or non-removable coating.

Additional objects, advantages and features of the various disclosed embodiments will be apparent to those skilled in the art upon examination of the description or may be learned by practice of the embodiments disclosed herein. Furthermore, the embodiments disclosed herein include all possible combinations of particular and preferred embodiments described herein.

EXAMPLES

The materials, methods, and examples presented herein are intended to be illustrative, and not to be construed as limiting the scope or content of the invention. Unless otherwise defined, all technical and scientific terms are intended to have their art-recognized meanings.

Example 1

Composition: A 10% by weight of Evonik's Eudragit S-100 (polyacidic polymer) is prepared by adding 48 g Eudragit S-100 to 170 mL of 1 M ammonium hydroxide and 267 mL water. This is mixed with a high torque propeller type mixing device (similar to a Lightnin Series 10 type of stirrer) until the resin is dissolved.

Solution B: 100 mL of a 16.7% by weight of Aquazol 200 (polyoxazoline or compatabilizer) is made in de-ionized water. Solution B is added to Solution A and mixed with the high torque stirrer for 1 hour.

Solution C: To the mixture of Solution A and B, 450 mL of Polynt Aquamac 575 acrylic resin dispersion (acrylic film-forming polymer) is added with constant stirring for 4 hours to complete the mixture. Additional anti-biological, anti-foamers can be added in liquid form at this point at appropriate levels. The coating mixture at this point will have a viscosity suitable to be brush applied; addition de-ionized water (0-20% v/v) can be added at this point to adjust the final viscosity to make the mixture compatible for spray application. Furthermore, the coating will meet or exceed the currently most stringent requirement and will exhibit a VOC emission of about 50 g/L or less.

In this composition the Evonik S-100 represents approximately 18% of the final total dried film weight. At a 18% S-100 concentration in the final film the MVTR through this material was measured to be 176 $g/m^2/day$ through a 10 micron film thickness of the dried film under an RH gradient of 100%-22% RH at 25° C. Typically this composition may take between 2-6 hours to dry to the touch after application; 7-14 days to reach the optimal film mechanical properties (when applied above 55° F.). Below 55° F. films are poorly formed without the aid of a coalescing agent.

Eastman's Texanol alcohol ester can be added to a level of 3% of the final dried film weight if the application temperature falls below 55° C. (in the present example this would be equal to 54 g of the coalescing agent in the final mixture added before application and mixed well into the coating solution). The dried films containing the S-100 at a 18% film weight level exhibited a Young's' Modulus of 41 MPa, and elongation-to-break of 185%, and a $T_g$ of −17.3° C. By comparison, the average Young's Modulus of Golden Acrylic Colors as exemplary artists' acrylic paints (Golden Heavy Bodied Acrylic Tube Colors) was 2.63 MPa and elongation-to-break of 56%.

The coating composition was applied by brush to the surface of previously aged (4 months) GAC Acrylic Heavy Bodied Acrylic Paints, allowed to dry, and were found to be reversible after 1 month without apparent effect to the underlying paints with a 30 second application of a pH 8.0 aqueous buffer solution applied with a cotton pad.

Example 2

Composition: Solution A: A 10% by weight of Evonik's Eudragit L-100 is prepared by adding 31 g Eudragit L-100 to 170 mL of 1 M ammonium hydroxide and 114 mL water. This is mixed with a high torque propeller type mixing device (similar to a Lightnin Series 10 type of stirrer) until the resin is dissolved.

Solution B: 100 mL of a 16.7% by weight of Aquazol 200 is made in de-ionized water. Solution B is added to Solution A and mixed with the high torque stirrer for 1 hour.

Solution C: To the mixture of Solution A and B, 330 mL of Polynt Aquamac 575 acrylic resin dispersion is added with constant stirring for 4 hours to complete the mixture. Additional anti-biological, anti-foamers can be added in liquid form at this point at appropriate levels. The coating mixture at this point will have a viscosity suitable to be brush applied; addition de-ionized water (0-20% v/v) can be added at this point to adjust the final viscosity to make the mixture compatible for spray application. Furthermore, the coating will meet or exceed the currently most stringent requirement and will exhibit a VOC emission of about 50 g/L or less.

In this composition the Evonik L-100 represents approximately 16% of the final total dried film weight. Typically this composition may take between 2-6 hours to dry to the touch after application; 7-14 days to reach the optimal film mechanical properties (when applied above 55° F.). Below 55° F. films are poorly formed without the aid of a coalescing agent.

The coating composition was applied by brush to the surface of previously aged (4 months) GAC Acrylic Heavy Bodied Acrylic Paints, allowed to dry, and were found to be reversible (removable) after 1 month without apparent effect to the underlying paints with a 30 second application of a pH 7.0 aqueous solution applied with a cotton pad.

Example 3

The compositions described in Example 1 and Example 2 are used as is or with slight modification in the following manner in concert with one another to also make use of the pH reversible nature of these coatings. If a layer of the coating described in Example 1 at 10-20 microns in thickness is applied to a mural paint surface and allowed to dry for 24 hours, the coating described in Example 2 can be adjusted to a pH of 6.5 by adding a neutralizing material (acid) to it to help adjust the pH to that level. The preferred neutralizing material might be an organic acid such as acetic acid or formic acid and added in dilute form (1M concentration) to the coating solution.

By adjusting the pH to 6.5 the coating described in Example 2 can be applied with a brush or spray application over the initial Example 1 coating material without disturbing it. This pH modified coating remains removable at a pH of between 6-6.5 without substantial effect on the Example 1 composition. Using a volatile organic acid helps retain film formation, and film mechanical properties in the Example 2 coating material. The pH modified Example 2 coating can be removed from the Example 1 (and underlying paint) with a pH 7 aqueous solution applied with a cotton pad.

Used in concert in this manner, the Example 2 coating material is a sacrificial coating that can be removed or renewed as needed without having to remove the Example 1 or subjecting the underlying acrylic paint to contact directly with the cleaning or re-solubilization solution.

Example 4

The 'multi-layer' application of coatings may also include non-pH reversible coating layers as well. An example of such an arrangement might be the direct application of a film-forming water-borne acrylic coating (e.g. Sherwin Williams Sher-Cryl®) or a solvent based coating material (VOC allowable, and with a MVTR that is close to the paints themselves), preferably soluble in an aliphatic hydrocarbon type of solvent (e.g. Golden Acrylic Colors MSA varnish®) directly on the mural paint surface. The non-reversible acrylic coating can be brush or spray applied to a paint surface and allowed to thoroughly dry. This coating must be considered a permanent addition to the mural paint surface.

A subsequent or additional coating of the compositions in Example 1 or Example 2 is applied by brush or spray over the non-reversible coating as an additional coating which will be pH reversible with the appropriately aqueous buffer without effect on the permanent coating beneath or the mural paints themselves.

Example 5

To the coating of Example 1, above, 2.6 g benzotriazole (1.0% weight percent solids) was added as a corrosion inhibitor and adhesion promoter and mixed together.

The material of Example 5 was applied by brush to the surface of polished copper, brass, and steel, and allowed to dry. The materials were found to be protective of the underlying metal and removable after one-year without visual effect to the underlying metal with an application of pH 8.0 aqueous buffer solution applied with a cotton pad.

Example 6

Composition: A 10% by weight of Evonik's Eudragit S-100 (polyacidic polymer) is prepared by adding 48 g Eudragit S-100 to 170 mL of 1 M ammonium hydroxide and 267 mL water. This is mixed with a high torque propeller type mixing device (similar to a Lightnin Series 10 type of stirrer) until the resin is dissolved.

Solution B: 100 mL of a 16.7% by weight of Aquazol 200 (polyoxazoline or compatibilizer) is made in de-ionized water. 80 mL of Solution B is added to 252 mL of Solution A and mixed with the high torque stirrer for 1 hour.

Solution C: To the mixture of Solution A and B, 600 mL of Valspar Signature Latex Interior Satin (Lowes American Tradition Signature Colors, manufactured by Valspar Corporation) is added with constant stirring for 4 hours to complete the mixture.

The reversible pigmented composition was applied by brush to the surface of previously aged (4 months) GAC Acrylic Heavy Bodied Acrylic Paints, allowed to dry, and was found to be reversible after 1 month without apparent effect to the underlying paints with a 30 second application of a pH 8.0 aqueous buffer solution applied with a cotton pad.

Although embodiments of the invention have been described in considerable detail, those skilled in the art will appreciate that numerous changes and modifications may be made to the embodiments and preferred embodiments of the invention and that such changes and modifications may be made without departing from the spirit of the invention. It is therefore intended that the appended claims cover all equivalent variations as fall within the scope of the invention.

What is claimed is:

1. A composition comprising: a pigment or a coloring agent, an aqueous medium, a volatile base, an acrylic film-forming polymer, a compatibilizing polymer selected from the group consisting of: poly (2-ethyl-2-oxazoline), poly (2-methyl-2-oxazoline), poly (2-isopropyl-2-oxazoline), and combinations thereof, and a poly acidic polymer, wherein said composition comprises between 0.1 and 10% by weight of the poly acidic polymer, 20-50% by weight of the compatibilizing polymer, and between 30 and 60% by weight of the acrylic film-forming polymer and wherein said composition is capable of being applied to a substrate using aqueous means and removed from said same substrate using an aqueous buffer at a specific pH.

2. The composition according to claim 1, wherein the composition further comprises one or more of the following: a UV stabilizer, a coalescence material, a de-foaming agent, an anti-microbial agent, an agent to protect from temperature swings, and a flattening agent.

3. The composition according to claim 1, wherein said acrylic film-forming polymer is selected from the group consisting of: acrylic emulsions, styrene/acrylic emulsions, and combinations thereof.

4. The composition according to claim 1, wherein said acrylic film-forming polymer is present as an aqueous dispersion.

5. The composition according to claim 1, wherein said poly acidic polymer is an acrylic copolymer having a carboxylic acid group capable of salt formation.

6. The composition according to claim 1, further comprising an anti-corrosive agent.

7. The composition according to claim 6, wherein the anti-corrosive agent is selected from the group consisting of: methylamine, dimethyl amine, ethylamine, propyl amine, cyclohexylamine, triethylentetramine (TETA), hexamethylentetramine (EMTA), monoethanolamine (MEA), triethanolamine (TEA), dimethylethanolamine (DMEA), methyldiethanolamine (MDEA), 2-(methyl(phenyl)amino)ethanol, 2,2'-(phenylazanediyl)diethanol, 2-(phenylamino)ethanol, mono-carboxylate salts, oligo-carboxylate salts, poly-carboxylate salts, triazoles, benzotriazole, tannates, inorganic inhibitors, chromates, silicates, stannates, zinc oxide, a salt of organo-nitrogens, and combinations thereof.

8. A method of coating a substrate with a removable composition comprising:
   a. forming a composition according to claim 1,
   b. coating said substrate with said composition, and
   c. allowing said composition to dry.

9. The method of claim 8 wherein said dried composition is capable of being removed at a pH of greater than 6.0 in an aqueous buffer.

10. The method of claim 8, wherein said coating is applied as a first layer of a first composition, said method further comprising:
   d. applying a second layer of a second composition comprising: an aqueous medium, a volatile base, an acrylic film-forming polymer, a compatibilizing polymer, and a poly acidic polymer, and wherein said second composition comprises different concentrations of components or different components wherein the second composition is capable of being applied to a substrate using aqueous means and removed from said same substrate using an aqueous buffer at a specific pH by removing said composition, and
   e. wherein said first and second compositions are capable of being re-solubilized at a different pH.

11. The method of claim 10, wherein said first layer is capable of being re-solubilized at a pH of about 1.0 unit greater than said second adjacent layer in an aqueous medium, or wherein said first layer is capable of being removed at a pH of about 8.0 or more and wherein said second layer is capable of being removed at a pH of about 7.0 in an aqueous medium.

12. The method of claim 8, further comprising applying a non-pH reversible coating applied to the substrate prior to the application of the first layer of said first composition.

13. The method of claim 10, further comprising applying a third layer of a third composition comprising: water, a volatile base, an acrylic film-forming polymer, a compatibilizing polyoxazoline polymer, and a poly acidic material, provided that each outer adjacent layer is removed at a pH of about 1.0 unit less than an adjacent inner layer.

14. A composition comprising latex-based aqueous paint, a poly acidic polymer, a compatibilizing polyoxazoline polymer selected from the group consisting of: poly (2-ethyl-2-oxazoline), poly (2-methyl-2-oxazoline), poly (2-isopropyl-2-oxazoline), and combinations thereof, and one or more of the following: a UV stabilizer, a coalescence material, a de-foaming agent, an anti-microbial agent, an agent to protect from temperature swings, an anti-corrosive agent, and a flattening agent;
   wherein the composition comprises the latex-based aqueous paint present between 30 and 60% by weight, the compatibilizing polymer is present at between 20 and 50% by weight, and the poly acidic polymer is present at between 0.1 and 10% by weight.

15. The composition of claim 14, wherein the composition is removable with an aqueous buffer.

16. The composition of claim 14, wherein said poly acidic polymer is an acrylic copolymer having a carboxylic acid group capable of salt formation.

17. The composition of claim 15, wherein the aqueous buffer is a buffer having a concentration of at least 0.5M and a pH of between 6 and 10.

18. A composition comprising: a pigment or a coloring agent, an aqueous medium, an acrylic film-forming polymer, a compatibilizing polymer selected from the group consisting of: poly (2-ethyl-2-oxazoline), poly (2-methyl-2-oxazoline), poly (2-isopropyl-2-oxazoline), and combinations thereof, and a polyacidic polymer, wherein said composition comprises between 0.1% and 10% by weight of the poly acidic polymer, between 20% and 50% by weight of the compatibilizing polymer, and between 30% and 60% by weight of the acrylic film-forming polymer and, wherein the acrylic film-forming polymer is immiscible with the poly acidic polymer, absent the compatibilizing polymer, and a volatile base to adjust pH, wherein said composition forms a film on a substrate to which it is applied, said film being made up of the pigment or coloring agent, the aqueous medium, the acrylic film-forming polymer, the compatibilizing polymer, and the poly acidic polymer.

19. The composition of claim 18 wherein said poly acidic polymer is an acrylic copolymer having a carboxylic acid group capable of salt formation.

* * * * *